US012240096B2

(12) United States Patent
Wallgren

(10) Patent No.: US 12,240,096 B2
(45) Date of Patent: Mar. 4, 2025

(54) PORTABLE SOCKET HOLDER FOR SOCKETS OR BITS CONNECTABLE TO A POWER TOOL

(71) Applicant: ATLAS COPCO INDUSTRIAL TECHNIQUE AB, Stockholm (SE)

(72) Inventor: Carl Johan Erik Wallgren, Stockholm (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 542 days.

(21) Appl. No.: 17/620,160

(22) PCT Filed: Jun. 17, 2020

(86) PCT No.: PCT/EP2020/066682
§ 371 (c)(1),
(2) Date: Dec. 17, 2021

(87) PCT Pub. No.: WO2020/254354
PCT Pub. Date: Dec. 24, 2020

(65) Prior Publication Data

US 2022/0274247 A1 Sep. 1, 2022

(30) Foreign Application Priority Data

Jun. 20, 2019 (SE) .................................... 1930212-4

(51) Int. Cl.
*B25H 3/00* (2006.01)
*B25F 5/00* (2006.01)
*B25H 3/06* (2006.01)

(52) U.S. Cl.
CPC ............... *B25H 3/003* (2013.01); *B25F 5/00* (2013.01); *B25H 3/06* (2013.01)

(58) Field of Classification Search
CPC .............. B25H 3/003; B25H 3/06; B25F 5/00
See application file for complete search history.

(56) References Cited

U.S. PATENT DOCUMENTS 7,286,059 B2 * 10/2007 Drake .................... B25H 3/003 206/217
9,625,143 B2 * 4/2017 Hsu ........................ B25H 3/003
(Continued)

FOREIGN PATENT DOCUMENTS

DE 102016217897 A1 3/2018
EP 3205456 A1 8/2017
(Continued)

OTHER PUBLICATIONS

Atlas Copco Industrial Technique AB, International Patent Application No. PCT/EP2020/066682, International Search Report, Apr. 21, 2021.
(Continued)

*Primary Examiner* — Stanton L Krycinski
(74) *Attorney, Agent, or Firm* — Moore & Van Allen PLLC; W. Kevin Ransom

(57) ABSTRACT

The present disclosure relates to a portable socket holder for sockets or bits connectable to a power tool. The portable socket holder comprising socket compartments for different types of sockets or bits. The portable socket holder further comprising visually indication means arranged to visually indicate a socket compartment. Further the portable socket holder comprising a processor and a memory containing instructions executable by the processor, wherein the portable socket holder is operative to visually indicate by means of the visually indication means a socket compartment. The portable socket holder further comprising tightening joint element compartments for different types of tightening joint elements. The portable socket holder further comprising visually indication means arranged to visually indicate a tightening joint compartment. The portable socket holder further arranged to visually indicate based on which socket compartment that is visually indicated from which tighten-
(Continued)

ing joint element compartment a tightening joint element should be removed.

16 Claims, 2 Drawing Sheets

(56) References Cited

U.S. PATENT DOCUMENTS

| | | | | |
|---|---|---|---|---|
| 9,741,014 | B2 * | 8/2017 | Rogers | G06Q 10/087 |
| 10,471,586 | B2 * | 11/2019 | Wright | B25H 3/04 |
| 11,049,177 | B2 * | 6/2021 | White | B25H 3/028 |
| 11,850,116 | B2 * | 12/2023 | Schlueter | A61B 90/90 |
| 2006/0082466 | A1 * | 4/2006 | Drake | B25H 3/003 340/686.1 |
| 2009/0072029 | A1 * | 3/2009 | Martin | B25H 3/028 235/385 |
| 2013/0250117 | A1 * | 9/2013 | Pixley | B25H 3/00 348/143 |
| 2013/0346261 | A1 * | 12/2013 | Phillips | G07C 9/22 705/28 |
| 2017/0098049 | A1 * | 4/2017 | Sweeney | G06Q 10/0875 |
| 2019/0240828 | A1 * | 8/2019 | Lee | B25H 3/021 |

FOREIGN PATENT DOCUMENTS

| | | | |
|---|---|---|---|
| WO | 2011049862 | A1 | 4/2011 |
| WO | 2016146194 | A1 | 9/2016 |
| WO | WO-2018050415 | A1 * | 3/2018 |
| WO | 2019052920 | A1 | 3/2019 |
| WO | 2020052920 | A1 | 3/2020 |

OTHER PUBLICATIONS

Atlas Copco Industrial Technique AB, International Patent Application No. PCT/EP2020/066682, Written Opinion, Apr. 21, 2021.

Atlas Copco Industrial Technique AB, International Patent Application No. PCT/EP2020/066682, International Preliminary Report on Patentability, Oct. 1, 2021.

* cited by examiner

PORTABLE SOCKET HOLDER FOR SOCKETS OR BITS CONNECTABLE TO A POWER TOOL

CROSS-REFERENCE TO RELATED APPLICATIONS

This application is a National Stage Patent Application (filed under 35 § U.S.C. 371) of PCT/EP2020/066682, filed Jun. 17, 2020 of the same title, which, in turn claims priority to Swedish Patent Application No. 1930212-4 filed Jun. 20, 2019 of the same title; the contents of each of which are hereby incorporated by reference.

FIELD OF THE INVENTION

The present invention generally relates to accessories for power tools, more particularly to a portable socket holder.

BACKGROUND OF THE INVENTION

Different types of power tools are often used in various industries. One type of power tool that is used is power tools for tightening screw or bolts. These power tools are provided with a rotatable output shaft at which a bit or socket is arranged. The bit or socket is adapted for a specific type of screw or bolt that should be tightened. It is also important that the power tool is set in a correct operating mode for the type of screw or bolt that should be tightened. This in order to tighten the screw or bolt to e.g. the correct torque or angle.

Not only the type of screw or bolt that should be tightened affects the tightening program that the power tool should be set in, but also the type of joint at which the screw or joint is located.

Thus, for a specific screw joint, it is important that either the correct bit or socket is chosen and that the correct operating mode is chosen for the power tool. It is also important that the correct screw or bolt is chosen.

Thus, there is a need for a solution, which solves or at least mitigates, the problem of choosing the correct bit or socket, the correct screw or bolt and set the power tool in the correct operating mode for the screw joint to be tightened.

SUMMARY OF THE INVENTION

Accordingly, it would be desirable to provide a portable socket holder for sockets or bits which offers an operator support for safely obtaining a correct assembly operation by choosing correct socket or bit and tightening joint element to be used in different specified mounting positions on an object to be assembled. In particular, it would be desirable to provide such a socket holder which also assist in setting the power tool in the correct operating mode based on which socket that should be used for the specific tightening. To address one or more of these concerns a socket holder as defined in the independent claims is provided. Preferred embodiments are defined in the dependent claims.

According to a first aspect of the present disclosure a portable socket holder for sockets or bits connectable to a power tool is disclosed. The portable socket holder comprising socket compartments for different types of sockets or bits. The portable socket holder further comprising visually indication means arranged to visually indicate a socket compartment. Further the portable socket holder comprising a processor and a memory containing instructions executable by the processor, wherein the portable socket holder is operative to visually indicate by means of the visually indication means a socket compartment. The portable socket holder further comprising tightening joint element compartments for different types of tightening joint elements. The portable socket holder further comprising visually indication means arranged to visually indicate a tightening joint compartment. The portable socket holder being further arranged to visually indicate based on which socket compartment that is visually indicated from which tightening joint element compartment a tightening joint element should be removed.

According to the first aspect, the portable socket holder provides an inventive solution to the concerns described above by means of a design incorporating tightening joint element compartments for different types of tightening joint elements and visually indication means arranged to visually indicate a tightening joint compartment based on which socket compartment that is visually indicated.

The portable socket holder according to the disclosure therefore provides improved quality control as well as improved safety by means of the provision of one inventive structure, i.e. the portable socket holder being further arranged to visually indicate based on which socket compartment that is visually indicated from which tightening joint element compartment a tightening joint element should be removed, thus also reducing the risk of choosing wrong tightening joint element.

This since the operator is guided from which tightening joint element compartment a tightening joint element should be removed. And wherein the guidance is based on which socket compartment that is visually indicated, the inventive design of the socket holder according to independent claim 1 cleverly solves both the problem of choosing the correct socket or bit and choosing the correct tightening joint element for the joint to be tightened.

According to one embodiment, the portable socket holder is further operative to initiate setting of the correct tightening program that the power tool should perform based on from which socket compartment a socket has been removed. In this embodiment the portable socket holder sends a type of signal based on from which socket compartment a socket has been removed. The signal then initiates setting to the power in the correct tightening program. An advantage with this embodiment is that the power tool automatically is set in the correct tightening program for the socket or bit that has been removed from the portable socket holder.

According to another embodiment, the portable socket holder is further operative to sense if a tightening joint element has been removed from a tightening joint element compartment. Herby the portable socket compartment can notify an operator or initiate any other action in case a wrong tightening joint element has been removed from a tightening joint compartment.

According to another embodiment, the portable socket holder is further operative to notify an operator of the portable socket holder in case the operator removes a tightening joint element from a tightening joint element compartment that has not been visually indicated. In this embodiment the quality can be further improved since an operator then can change the tightening joint element to the correct tightening joint element.

In yet another embodiment the portable socket holder is further operative to lock the power tool in case the operator removes a tightening joint element from a tightening joint element compartment that has not been visually indicated. In this embodiment the quality can be yet further improved since it is not possible to perform a tightening operation with the power tool in case an operator has removed a wrong tightening joint element.

In yet another embodiment the portable socket holder is further operative to retrieve a position of the portable socket holder and wherein the portable socket holder is further operative to visually indicate a socket compartment based on the position of the portable socket holder. Hereby the portable socket holder can further improve the quality in a manufacturing process, since the correct socket or bit for a tightening at a specific position is visually indicated to the operator.

In yet another embodiment of the portable socket holder, the portable socket holder further comprising at least one power tool compartments and visually indication means arranged to visually indicate a power tool compartment based on the socket compartment that is visually indicated. Hereby the portable socket holder can be further operative to indicate which power tool that should be used for a specific tightening operation.

In yet another embodiment of the portable socket holder, the portable socket holder is further operative to lock the power tool in case a distance between the power tool and the portable socket holder is above a threshold distance. Thus, in case the power tool is located far away from the portable socket holder the power tool is locked. An advantage with this embodiment is that the power tool can be stop from performing tightening operations in case it is not located close to the portable socket holder.

In yet another embodiment of the portable socket holder, the portable socket holder further comprising a handle for carrying the portable socket holder (10).

According to a second aspect the present disclosure relates to a method in a portable socket holder for sockets or bits connectable to a power tool. Objectives, advantages and features conceivable within the scope of the second aspect of the invention are readily understood by the foregoing discussion referring to the first aspect of the invention.

Further objectives of, features of and advantages of the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The invention will be described in the following illustrative and non-limiting detailed description of exemplary embodiments, with reference to the appended drawing, on which

All figures are schematic, not necessarily to scale and generally only show parts which are necessary in order to elucidate the invention, wherein other parts may be omitted or merely suggested.

DETAILED DESCRIPTION

Figure 1:
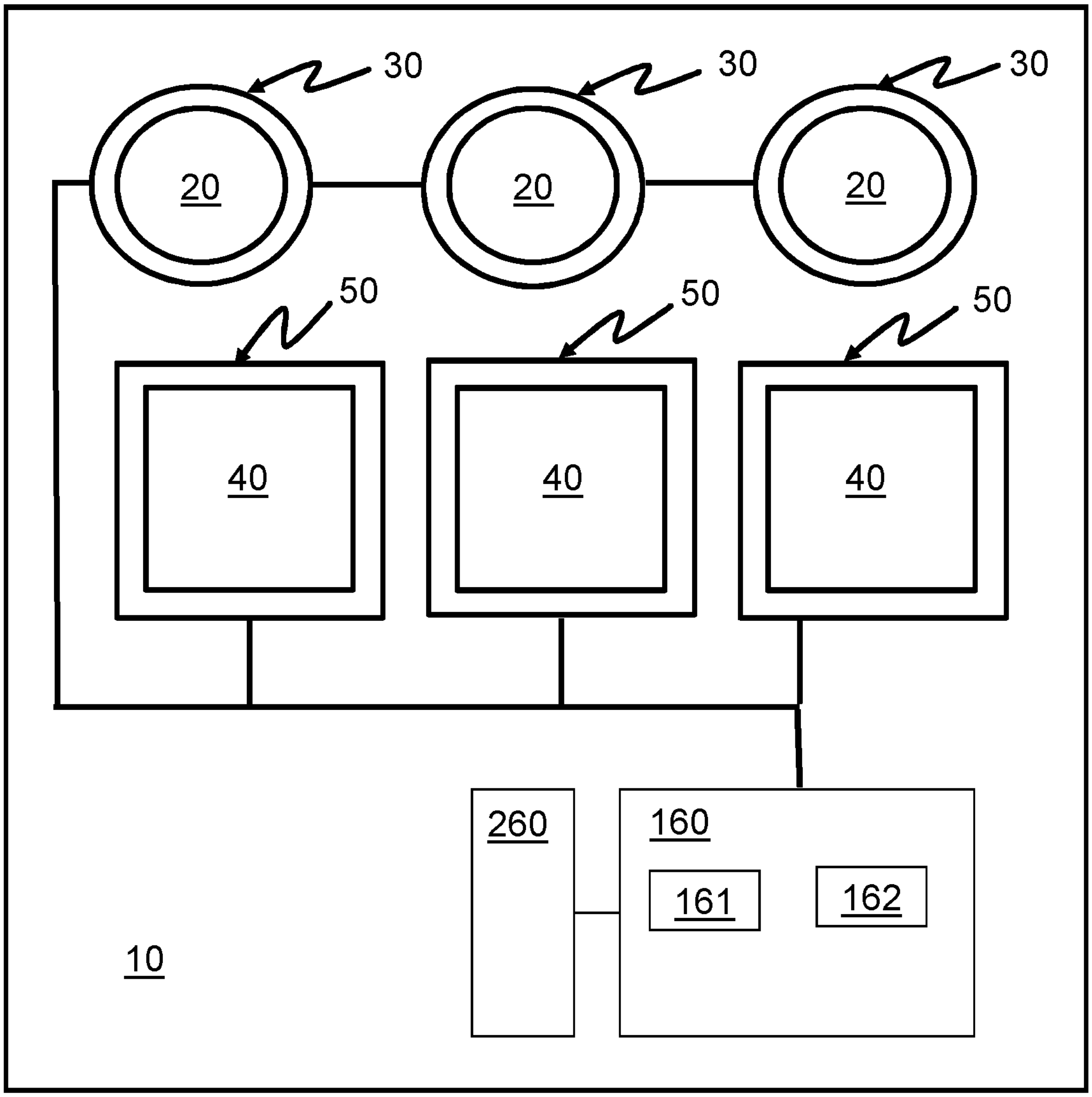
FIG. 1 is a schematic illustration of an exemplary portable socket holder 10 according to one embodiment.

A schematic illustration of an exemplary portable socket holder 10 for sockets or bits connectable to a power tool is illustrated in FIG. 1. The portable socket holder 10 comprising at least one socket compartments 20 for different types of sockets or bits. The portable socket holder 10 further comprising visually indication means 30 arranged to visually indicate a socket compartment 20. Further the portable socket holder comprising a processor 160 and a memory 260 containing instructions executable by the processor, wherein the portable socket holder 10 is operative to visually indicate by means of the visually indication means 30 a socket compartment 20. The portable socket holder 10 further comprising tightening joint element compartments 40 for different types of tightening joint elements. The portable socket holder further comprising visually indication means 50 arranged to visually indicate a tightening joint element compartment. The portable socket holder 10 being further arranged to visually indicate based on which socket compartment that is visually indicated from which tightening joint element compartment a tightening joint element should be removed.

The visually indication means 30 and 50 can be of many different types. According to one embodiment the visually indication means 30 and 50 are LED lights surrounding the at least one socket compartments 20 and the at least one tightening joint element compartments 40.

According to one exemplary embedment the portable socket holder 10 is further operative to visually indicate the socket compartment 20 based on a tightening program that the power tool should perform. In one exemplary embodiment the visually indication means 30 is first lit, which indicates that the operator should use the socket or bit from the socket compartment that is visually indicated. In another exemplary embodiment an operator first removes a socket or bit from a socket compartment 20. The portable socket holder is then operative to light the visually indication means 30 that is associated with the compartment 20 from which the operator moved the socket or bit.

As mention above in one exemplary embodiment the portable socket holder 10 is further operative to initiate setting of the correct tightening program that the power tool should perform based on the socket compartment that is visually indicated. In one exemplary embodiment the visually indication means 30 is first lit and the power tool is set in the tightening program that should be used for the socket or bit associated with the compartment 20 which is visually indicated. In another exemplary embodiment the operator first removes a socket or bit. Then the visually indication means 30 associated with the socket compartment from which the socket or bit was removed is lit, and the portable socket compartment 10 initiates setting of the correct tightening program for the power tool.

Also, as mentioned above, but not illustrated in FIG. 1, according to one exemplary embodiment the portable socket holder 10 is further operative to sense if a tightening joint element has been removed from a tightening joint element compartment. In one more specific embodiment the portable socket holder 10 is further operative to notify an operator of the portable socket holder 10 in case the operator removes a tightening joint element from a tightening joint element compartment that has not been visually indicated. In a further embodiment the portable socket holder is further operative to lock the power tool in case the operator removes a tightening joint element from a tightening joint element compartment that has not been visually indicated.

In a yet further embodiment, the portable socket holder 10 is further operative to retrieve a position of the portable socket holder 10 and wherein the portable socket holder 10 is further operative to visually indicate a socket compartment based on the position of the portable socket holder 10. Since the types of bolts and screw vary depending on location of a screw joint the potable socket holder can adapt the visually indication of socket compartment based on the position of portable socket holder.

In a yet further embodiment, the portable socket holder 10 further comprising at least one power tool compartments, and visually indication means arranged to visually indicate the power tool compartment based on the visually indication of the socket compartment. Hereby it is possible to guide the operator to choose the correct power tool based on which socket or bit that should be used.

In a yet further embodiment, the portable socket holder 10 is further operative to lock the power tool in case a distance between the power tool and the portable socket holder is above a threshold distance. Hereby it is possible to ensure that the power tool is not used for tightening operations for which the correct socket or bit has been chosen, and for which the correct tightening joint element has been chosen.

The portable socket holder 10 further comprising a processor 160 arranged to control the wireless power tool 100. The wireless power tool 100 also comprises a memory 260 containing instructions executable by the processor 160. The processor 160 is a Central Processing Unit, CPU, microcontroller, Digital Signal Processor, DSP, or any other suitable type of processor capable of executing computer program code. The memory 260 is a Random Access Memory, RAM, a Read Only Memory, ROM, or a persistent storage, e.g. a single or combination of magnetic memory, optical memory, or solid state memory or even remotely mounted memory.

Figure 2:
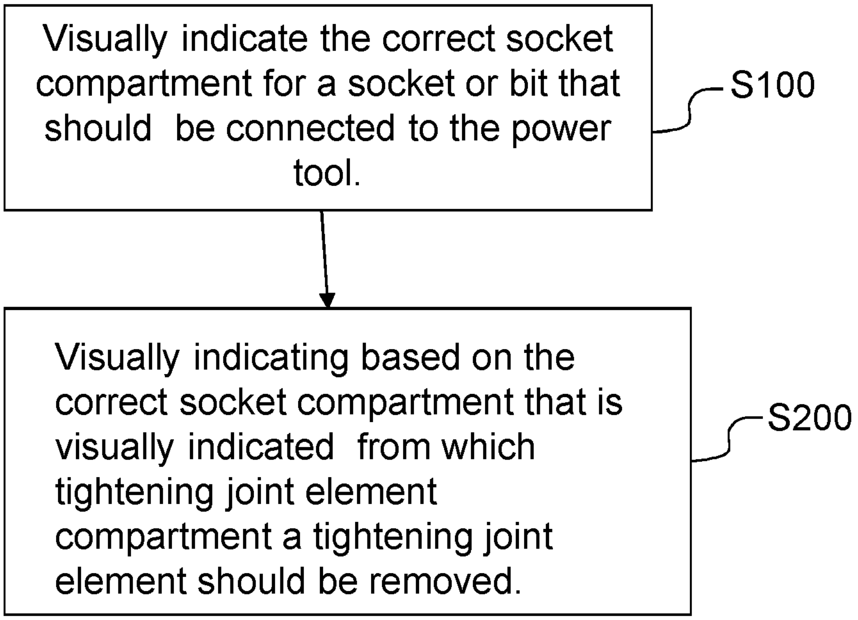
FIG. 2 is a flow chart of a method according to an exemplary embodiment of the present invention.

FIG. 2 illustrates a flowchart of a method in a portable socket holder 10 for sockets or bits connectable to a power tool. The portable socket holder 10 comprising sockets compartments for different types of sockets or bits and tightening joint element compartments. The method comprising a first step S100 of visually indicating a socket compartment 20 for a socket or bit that should be connected to the power tool. And a second step S200 of visually indicating based on the socket compartment that is visually indicated from which tightening joint element compartment a tightening joint element should be removed.

According to one exemplary embodiment the method comprising visually indicating a socket compartment based on a tightening program that the power tool should perform.

In yet another embodiment the method further comprising initiating setting of the correct tightening program that the power tool should perform based on from which socket compartment a socket has been removed.

In a further embodiment the method further comprising sensing if a tightening joint element has been removed from a tightening joint element compartment.

In another embodiment the method comprising visually notifying an operator of the portable socket holder 10 in case the operator removes a tightening joint element from a tightening joint element compartment that has not been visually indicated.

In yet another embodiment the method further comprising locking the power tool in case the operator removes a tightening joint element from a tightening joint element compartment that has not been visually indicated.

In yet another embodiment the method further comprising positioning the portable socket holder 10 and wherein the step of indicating socket compartment is based on the position of the portable socket holder 10.

According to one aspect, the disclosure further relates to the above mentioned computer program, comprising computer readable code which, when run on the portable socket holder 10 causes the wireless power tool 100 to perform any of the aspects of the disclosure described herein.

When the above-mentioned computer program code is run in the processor 160 of the portable socket holder 10 it causes the portable socket holder 10 to be operative to visually indicate by means of the visually indication means 30 the correct socket compartment. And further visually indicate based on which socket compartment that is visually indicated from which tightening joint element compartment a tightening joint element should be removed.

According to one aspect of the disclosure the processor 160 comprises one or several of:

a visually indication module 161 adapted to visually indicate by means of the visually indication means 30 a socket compartment 20; and a visually indication module 162 adapted to visually indicated from which tightening joint element compartment a tightening joint element should be removed based on which socket compartment that is visually indicated.

The modules 161 and 162 are implemented in hardware or in software or in a combination thereof. The modules 161 and 163 are according to one aspect implemented as a computer program stored in the memory 260 which run on the processor 160. The portable socket holder 10 is further configured to implement all the aspects of the disclosure as described herein.

While the invention has been illustrated and described in detail in the drawings and foregoing description, such illustration and description are to be considered illustrative or exemplary and not restrictive; the invention is not limited to the disclosed embodiment. The skilled person understands that many modifications, variations and alterations are conceivable within the scope as defined in the appended claims. Additionally, variations to the disclosed embodiments can be understood and effected by those skilled in the art in practicing the claimed invention, form a study of the drawings, the disclosure and the appended claims. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. A portable socket holder for sockets or bits connectable to a power tool, the portable socket holder comprising:

socket compartments for different types of sockets or bits;

first visual indication means arranged to visually indicate at least one of the socket compartments;

screw or bolt compartments for different types of tightening joint elements; and second visual indication means arranged to visually indicate at least one of the screw or bolt compartments; and a processor and a memory comprising computer code instructions executable by the processor, whereby, by operation of the computer code instructions, the processor controls the first and second visual indication means to visually indicate specific ones of the socket and screw or bolt compartments, wherein when said processor controls said first visual indication means to indicate a specific one of the socket compartments, said processor controls said second visual indication means to visually indicate, based on which socket compartment is indicated by said first visual indication means, a specific one of the screw or bolt compartments from which a screw or bolt should be removed for use with a socket from the specific socket compartment indicated by said first visual indication means, wherein said processor is further configured to sense if a screw or bolt has been removed from one of the screw or bolt compartments.

2. The portable socket holder according to claim 1, wherein said processor is further configured, via operation of the computer code instructions, to control said first visual indication means to visually indicate the specific socket compartment based on a tightening program that the power tool should perform.

3. The portable socket holder according to claim 2, wherein the processor is further configured via operation of the computer code instructions to initiate setting of the tightening program that the power tool should perform based on sensing from which socket compartment a socket has been removed.

4. The portable socket holder according to claim 1, wherein the processor is further configured via operation of the computer code instructions to notify an operator of the portable socket holder in an instance where the operator removes a screw or bolt from one of the screw or bolt compartments that has not been visually indicated.

5. The portable socket holder according to claim 1, wherein the processor is further configurated via operation of the computer code instructions to lock the power tool in an instance where said processor senses that the operator removes a screw or bolt from one of the screw or bolt compartments that has not been visually indicated by said second visual indication means.

6. The portable socket holder according to claim 1, wherein the processor is further configured via operation of the computer code instructions to:

retrieve a position of the portable socket holder; and visually indicate, via said first visual indication means, a socket compartment based on the position of the portable socket holder.

7. The portable socket holder according to claim 1, further comprising:

at least one power tool compartment; and third visual indication means arranged to visually indicate the at least one power tool compartment based on the specific socket compartment indicated by said first visual indication means.

8. The portable socket holder according to claim 6, wherein the processor is further configured via operation of the computer code instructions to lock the power tool in an instance where a distance between the power tool and the portable socket holder is greater than a threshold distance.

9. The portable socket holder according to claim 7, wherein the portable socket holder further comprises a handle for carrying the portable socket holder.

10. A method of operating the portable socket holder of claim 1, the method comprising the steps of:

visually indicating, via the first visual indication means, a specific one of the socket compartments for a socket or bit that should be connected to the power tool;

visually indicating, via the second visual indication means, based on which socket compartment is indicated by the first visual indication means a specific one of the screw or bolt compartments from which a screw or bolt should be removed for use with a socket from the specific socket compartment indicated by the first visual indication means; and sensing if a screw or bolt has been removed from one of the screw or bolt compartments.

11. The method according to claim 10, further comprising the step of:

visually indicating, via the first visual indication means, the specific socket compartment based on a tightening program that the power tool should perform.

12. The method according to claim 10, further comprising the step of:

initiating setting of a specific tightening program that the power tool should perform based on sensing from which socket compartment a socket has been removed.

13. The method according to claim 10, further comprising the step of:

visually notifying an operator of the portable socket holder in an instance where the operator removes a screw or bolt from one of the screw or bolt compartments that has not been visually indicated.

14. The method according to claim 10, further comprising the step of:

locking the power tool in an instance where it is sensed that the operator removes a screw or bolt from the one or more screw or bolt compartments-compartment that has not been visually indicated.

15. The method according to claim 10, wherein visually indicating visually a specific one of the socket compartments comprises retrieving a position of the portable socket holder; and visually indicating, via the first visual indication means, a specific one of the socket compartments based on the position of the portable socket holder.

16. A computer program product to operate the portable socket holder of claim 1, comprising computer program code stored on a non-transitory computer-readable storage medium, said computer program code comprising computer code instructions to cause one or more processors to perform the following operations:

visually indicating, via the first visual indication means, a specific one of the socket compartments for a socket or bit that should be connected to the power tool;

visually indicating, via the second visual indication means, based on which socket compartment is indicated by the first visual indication means a specific one of the screw or bolt compartments from which a screw or bolt should be removed for use with a socket from the specific socket compartment indicated by the first visual indication means; and sensing if a screw or bolt has been removed from one of the screw or bolt compartments.

* * * * *